J. E. BASTER.
CANE HARVESTER.
APPLICATION FILED MAR. 23, 1910
995,994.
Patented June 20, 1911.
3 SHEETS—SHEET 1.
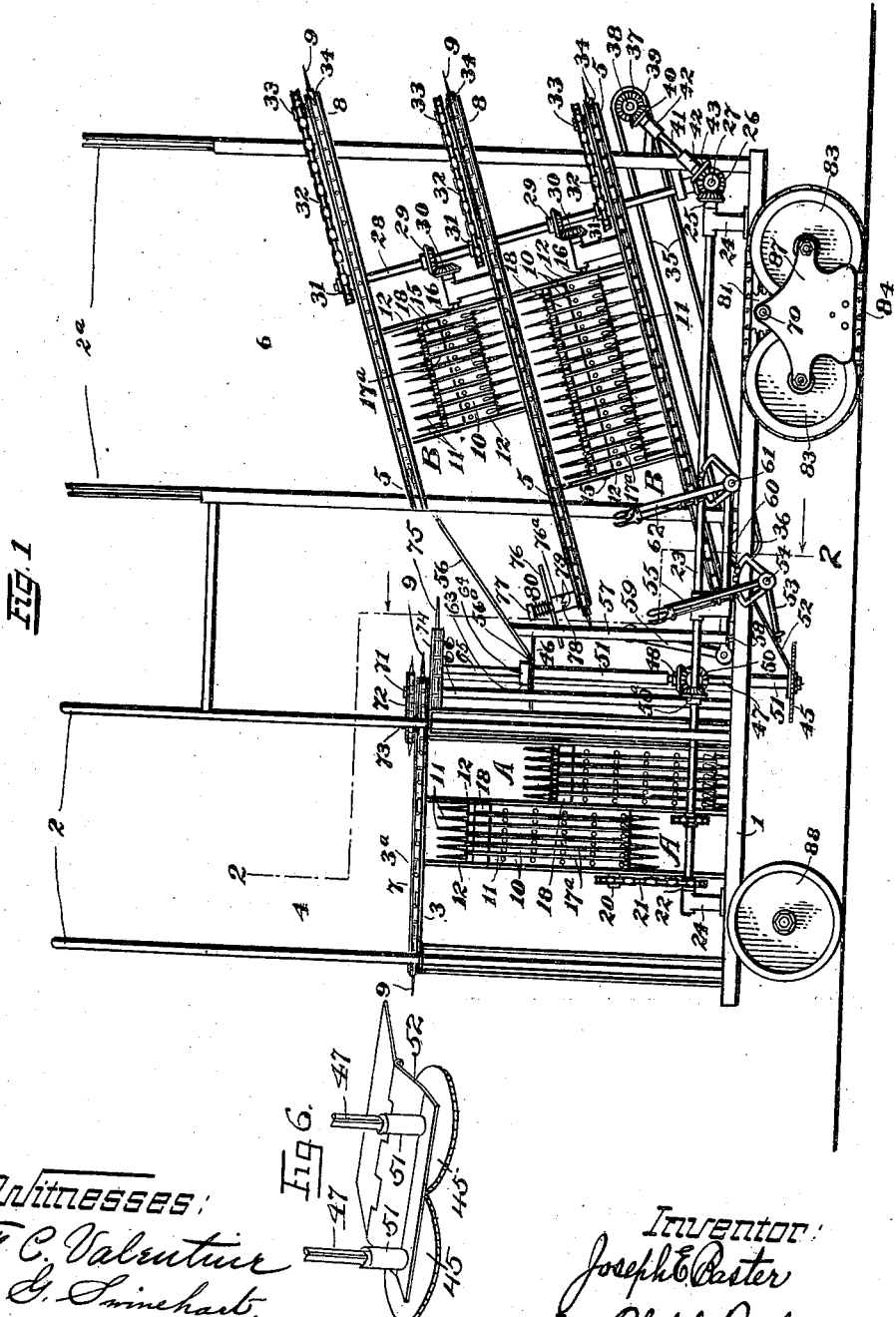

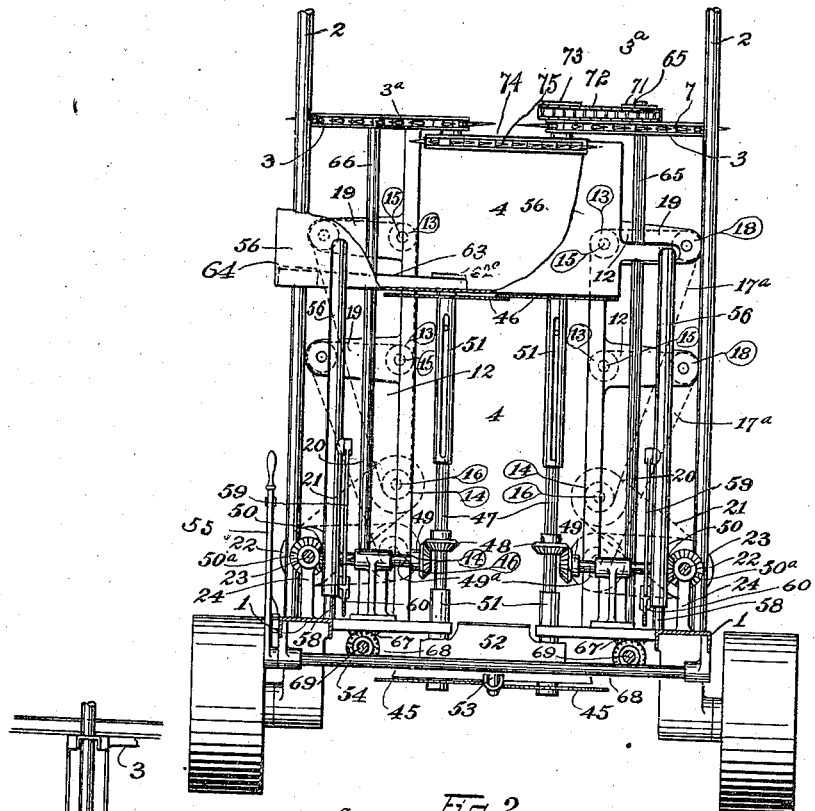

J. E. BASTER.
CANE HARVESTER.
APPLICATION FILED MAR. 23, 1910.

995,994.

Patented June 20, 1911.

3 SHEETS—SHEET 3.

Fig. 5

UNITED STATES PATENT OFFICE.

JOSEPH E. BASTER, OF CLEVELAND, OHIO.

CANE-HARVESTER.

995,994. Specification of Letters Patent. Patented June 20, 1911.

Original application filed March 1, 1909, Serial No. 480,792. Divided and this application filed March 23, 1910. Serial No. 551,184.

*To all whom it may concern:*

Be it known that I, JOSEPH E. BASTER, a citizen of the United States, residing at Cleveland, in the county of Cuyahoga and State of Ohio, have invented certain new and useful Improvements in Cane-Harvesters, of which the following is a specification.

My invention relates to improvements in cane-harvesters, the invention being designed to cut, top, and convey sugar-cane in a vertical position to the rear portion of the machine where it may be accumulated in bundles or conveyed into a wagon or cart as desired.

The invention is particularly designed and adapted to be operated in conjunction with cane stripping mechanism comprising a plurality of vertically disposed endless stripper members arranged in banks at the sides of suitable cane stock receiving and conveying guide-ways as disclosed and claimed in my patent for improvements in cane-strippers Number 954,159, of April 5, 1910, of which this application is a divisional part.

With the above mentioned objects in view, the invention in its present embodiment consists in the novel construction, arrangement, and combination of parts, hereinafter described, illustrated in the accompanying drawings, and particularly pointed out in the appended claims.

Referring to the drawings, forming a part of this specification, Figure 1, is a side elevation of a cane-harvester constructed in accordance with this invention. Fig. 2, a cross sectional view taken on line 2—2 of Fig. 1, the endless stripper members arranged in front of the harvester elements being removed. Fig. 3, a side elevation of the same. Fig. 4, a top plan view of the cane severing disks. Fig. 5, a top plan view of the improved cane harvester. Fig. 6, a perspective view of the vertically adjustable cane-severing disks, and inclined movable plate leading from said disks to the front end of the stalk supporting conveyer member.

Similar numerals of reference designate like parts throughout all the figures of the drawings.

The carriage or frame of the improved harvester comprises a U-shaped base frame 1, having its open end extending forwardly and carrying a plurality of vertically-disposed arch-shaped members 2, and 2ª, the arch shaped members 2, at the front portion of the machine carrying a pair of horizontally-extending conveyer guide-members or frames 3, providing an intermediate cane-stalk receiving guide way 4. The arch shaped rear members 2ª, are provided with a plurality of horizontally-extending conveyer guide-members 5, preferably, upwardly inclined as shown and spaced apart to provide an intermediate cane stalk conveyer guide-way 6.

The conveyer guide members or frames 3, at the front of the machine are provided with rearwardly converging front portions 3ª, leading to the cane stalk receiving guideway 4, and endless cane stalk receiving and conveying members 7, operated as hereinafter described. The conveyer guide members 5, are provided with endless cane stalk conveyer members 8, operated as hereinafter described, said cane stalk conveying members 7, and 8, being armed with stalk engaging arms 9, adapted to engage and convey the cane-stalks in a vertical position throughout the guide-ways 4, and 6.

The cane-stripping mechanism of the improved harvester comprises a plurality of vertically disposed endless stripper members 10, arranged in banks A and B, at the sides of the guide-ways 4, and 6, at the front and rear portions of the machine, said stripper members 10 being armed with stripper-arms 11, adapted to travel vertically and downwardly on each side of the cane-stalks and at right angles to the line of travel of the conveyer members 7, and 8, said stripper arms projecting into the guide-ways 4, and 6, as shown in the drawings. Each bank of endless stripper members comprises a pair of end bearing bars or plates 12, carrying an upper roller 13, and a lower driving roller 14, and the rollers 13, and 14, are mounted on bearing shafts 15, and 16, motion being imparted to the endless stripper members by means of the lower driving rollers 14, on the shafts 16, said shafts 16, being provided with suitable gearing as hereinafter described. As a means for clearing or cleaning the stripper arms 11, of any cane leaves which may cling thereto, a plurality of endless stripper cleaner members 17, are interposed between the stripper arms 11, of the endless stripper members 10, and are extended rearwardly to form angled stripper arm cleaning portions 17ª, extending to the rear and at an angle to the line of travel of the return portions of said armed stripper members. In the present instance, said stripper cleaner members consist of endless cable members carried upon and moving with the rollers 13, and 14, the rearwardly extending angled cleaning portion 17ª, being formed by means of an idle roller 18, carried by and interposed between rearwardly extending bearing arms 19, of the main bearing plates 12. The endless stripper members 10, comprised in the front banks A, are adapted to act upon the cane stalks before the latter are severed and topped by the mechanism hereinafter described, the stripper members comprised in said banks being operated by means of sprocket wheels 20, on the driving shafts 16, said sprocket wheels being provided with sprocket chains 21, passing over sprocket wheels 22, carried upon longitudinally-extending driving shafts 23, mounted in bearings 24, carried by the side members of the U-shaped frame 1.

The driving shafts 23, are provided at their rear ends with beveled gears 25, meshing with bevel gears 26, carried upon a transversely disposed driving shaft 27, at the rear of the machine, said driving shaft being connected to and driven by any suitable and convenient source of power.

As a means of imparting motion to the cane stalk conveyer members 8, and endless stripper members 10, comprised in the rear banks B, a pair of driving shafts 28, are mounted at the sides of the cane stalk conveyer guide-way 6, and geared at their lower ends to the main driving shaft 27. The driving shafts 28, are provided with beveled gears 29, meshing with beveled gears 30, carried upon the ends of the driving shafts 16, of the banks B, and said driving shafts 28, are also provided with sprocket wheels 31, carrying sprocket chains 32, passing over sprocket wheels 33. The sprocket wheels 33, are mounted on driving shafts provided with sprocket wheels 34, carrying the rear ends of the cane-stalk conveyer members 8.

An endless stalk-supporting conveyer-member 35, is mounted beneath the guide-way 6, and carried upon an idle roller 36, at its front and a driving roller 37, at its rear. The driving roller 37, is driven by means of a driving shaft 38, carrying a bevel gear 39, meshing with a bevel gear 40, on an inclined driving shaft 41. The inclined driving shaft 41, is mounted in suitable bearings 42, at the rear of the machine and is provided with a second bevel gear 43, meshing with a bevel gear 44, on the main driving shaft 27.

The cane stalk severing and topping mechanism comprises a pair of cane severing disks or saws 45, and a pair of cane topping disks or saws 46. The cane severing and topping disks or saws are mounted at the rear of the cane receiving guide way 4, and are vertically adjustable upon a pair of vertical disk or saw driving shafts 47. The driving shafts 47, are provided with bevel gears 48, meshing with bevel gears 49, on transversely disposed driving shafts 49ª. The driving shafts 49ª, are provided at their ends with bevel gears 50, meshing with bevel gears 50ª, on the driving shafts 23. The cane severing and topping disks 45, and 46, are carried upon the ends of tubular shafts 51, keyed upon the driving shafts 47, in a well known manner for permitting vertical or longitudinal movement or adjustments upon the driving shafts 47, the cane severing disks or saws 45, being suspended and capable of vertical adjustment by means of an inclined movable plate 52, leading to the front end of the stalk supporting conveyer member 35, said inclined plate being adapted to be raised or lowered by means of an arm 53, attached to a rock shaft 54, adapted to be oscillated by means of a lever 55. The cane topping disks or saws 46, are suspended and capable of vertical adjustment by means of an inclined cane top receiving plate 56, carried upon tubular guide arms 57, slidably mounted upon guide stems 58. The tubular guide arms 57, are capable of vertical adjustment by being connected to a connecting arm 59, pivotally connected to and carried upon the free end of the crank arm 60, said crank arm being carried by rock shaft 61, provided with a lever 62. One of the tubular shafts carrying one of the topping disks 46, is provided with a pulley 62ª, carrying a belting 63, extending over an idle pulley 64. The belting 63, is adapted to carry away the tops of the cane stalks as they fall into the channel portion 56ª, of the cane top receiving plate 56.

The cane stalk receiving and conveying members 7, are driven by means of vertical driving shafts 65, and 66, provided at their lower ends (see Fig. 2) with bevel gears 67, meshing with bevel gears 68, on a second pair of longitudinally-extending driving shafts 69. The driving shafts 69, are suitably geared at their rear ends to the main driving shaft 70, for propelling the machine as hereinafter described. The vertical driving shaft 65, is provided with a sprocket wheel 71, carrying a sprocket chain 72, said sprocket-chain 72, passing over a second sprocket-wheel mounted upon the shaft 73, said shaft 73, being also provided with a sprocket wheel carrying the rear portion of the adjacent cane stalk receiving and conveying member 7. As a means for carrying the severed tops to the cane top-receiving plate 56, a rearwardly and laterally extending guide member 74, is provided said guide member 74, being provided with an armed cane top receiving and conveying member 75, passing over a sprocket wheel on the shaft 73, and being driven in a manner similar to the cane stalk receiving and driving members 7.

The topped and severed cane stalks are prevented from falling forward and are assisted in being carried in a vertical position to the front portion of the cane stalk conveyer guide way 6, by means of a plurality of horizontally revolving cane stalk engaging arms 76, carried upon revoluble shafts 77, said shafts being revolved by means of sprocket wheels carrying the front ends of the adjacent cane stalk conveyer members 8. As a means for preventing the engaging arms 76, from retarding the entrance of the vertically-disposed cane stalks into the guideways 6, the hub portion 76$^a$, is provided with inclined interlocking teeth 78, normally engaged by similarly shaped teeth 79, on the shaft 77, said hub portion 76$^a$, being normally held in interlocking engagement with the shaft 77, by means of a coiled spring 80, it being evident that by reason of this construction should the cane stalks be carried into the guide ways 6, faster than the revolution of the arms 76, that the inclined portions of the teeth 78, and 79, will cause the hub portion 76$^a$, to be elevated against the resistance of the spring 80, and the cane stalk engaging arms 76, will be revolved so as not to retard the entrance of the cane stalks into the conveyer guide-way 6.

The main driving or axle shaft 70, may be operated by any suitable and convenient source of power and is provided at each side with a pinion wheel 81, meshing with gear wheels 82, carried upon the inner sides of a pair of traction wheels 83. As a means for providing for an increased traction or bearing surface an endless traction member is mounted upon each pair of traction wheels 83, said endless traction members, preferably, comprising a pair of sprocket chains 84.

The front bearing wheels 88, of the carriage may be mounted in any suitable and convenient manner and guided in any manner deemed most appropriate for the purposes of this invention.

Having thus described my invention, what I claim and desire to secure by Letters Patent is,—

1. A cane stalk severing and topping mechanism, comprising a pair of vertical driving shafts, cane stalk severing and topping disks slidably mounted on said shafts, means for supporting and conveying the cane-stalks in a vertical position after being severed and topped by said disks and means including cane stalk and cane top receiving plates for vertically supporting and independently adjusting said disks on said shafts.

2. A cane stalk severing and topping mechanism, comprising a pair of vertical driving shafts, topping and severing disks slidably mounted thereon, means including cane stalk and cane top receiving plates for vertically supporting and independently adjusting said disks, and means for conveying the severed cane tops from said disks.

3. A cane stalk severing and topping mechanism, comprising a pair of vertical driving shafts, topping and severing disks slidably mounted thereon, a cane top receiving plate vertically supporting said topping disks, means for supporting and adjusting said plate, means for independently supporting and adjusting said severing disks and means for conveying the severed cane tops on said plate.

4. A cane stalk severing mechanism, comprising a pair of vertical driving shafts, cane severing disks slidably mounted thereon, a pivotally mounted plate having its free edge vertically supporting said severing disks, and means for supporting and adjusting the free edge of said plate.

5. A cane stalk severing and topping mechanism, comprising a pair of vertical driving shafts, cane topping disks slidably mounted on said shafts, a cane top receiving plate vertically supporting said disks, means for supporting and adjusting said plate, cane severing disks slidably mounted on said shafts, a pivotally mounted plate having its free end vertically supporting said severing disks, and means for supporting and adjusting the free end of said plate.

6. In a cane harvester, a cane stalk receiving guide-way, a pair of vertical driving shafts, cane severing disks slidably mounted on said shafts and extending into said guideway, a cane stalk conveyer guide-way, a stalk-supporting conveyer member beneath said stalk conveyer guide-way, a movable plate pivotally secured in front of said stalk conveyer guide-way and having its free edge vertically supporting said severing disks, and means for supporting and adjusting the free edge of said plate.

7. In a cane harvester, a combination with a carriage provided with a cane receiving guide-way, a pair of vertical shafts at the rear and at each side of said guide-way, a cane stalk conveyer guide-way at the rear of said shafts, and a stalk-supporting conveyer-member beneath said last mentioned guide-way; of top severing disks vertically movable on said shafts, means for supporting and vertically moving said top severing disks, cane stalk severing disks vertically movable on said shafts, means for revolving said shafts, and means for supporting and vertically moving said cane stalk severing disks.

8. In a cane harvester, a carriage provided at its front with conveyer guide members affording an intermediate cane receiving guide-way, endless conveyer members carried in said guide members, vertically adjustable cane severing and topping disks mounted at the rear of said cane receiving guide-way, cane stalk and cane top receiving plates at the rear of said severing and topping disks, respectively stalk conveyer guide members spaced apart and providing an intermediate stalk guide-way at the rear of said cane severing and topping disks, means for supporting and conveying the severed cane-stalks in a vertical position in said stalk guide-way, and a stalk supporting conveyer member mounted beneath said stalk guide-way.

9. A cane harvester, comprising a carriage provided with a pair of revoluble shafts carrying vertically adjustable cane severing and topping disks, cane stalk and cane top receiving plates at the rear of said severing and topping disks, respectively conveyer guide members providing an intermediate cane receiving guide-way leading to said disks, conveyer guide members providing an intermediate stalk guide-way at the rear of said cane severing and topping disks, means for supporting and conveying the severed cane-stalks in a vertical position in said guide-way and a stalk supporting conveyer member mounted beneath said stalk guide-way.

10. In a cane harvester, a carriage provided with a cane receiving guide-way, a pair of vertical driving shafts at the rear of said guide-way, a stalk guide-way at the rear of said driving shafts, cane conveyer members at the sides of said guide-ways, a stalk supporting conveyer member mounted beneath said stalk guide-way, cane stalk topping and severing disks mounted on said vertical driving shafts and longitudinally movable thereon, and means for supporting and independently adjusting said topping and severing disks.

In testimony whereof I have affixed my signature, in presence of two witnesses.

JOSEPH E. BASTER.

Witnesses:
O. C. BILLMAN,
FRANK BILLMAN.

---

Copies of this patent may be obtained for five cents each, by addressing the "Commissioner of Patents, Washington, D. C."